United States Patent [19]

Neeser et al.

[11] Patent Number: 5,127,230
[45] Date of Patent: Jul. 7, 1992

[54] LNG DELIVERY SYSTEM FOR GAS POWERED VEHICLES

[75] Inventors: Timothy A. Neeser, Savage; Kelly W. Hedegard, Eden Prairie, both of Minn.

[73] Assignee: Minnesota Valley Engineering, Inc., New Prague, Minn.

[21] Appl. No.: 702,076

[22] Filed: May 17, 1991

[51] Int. Cl.$^5$ .................................................. F25B 19/00
[52] U.S. Cl. .................................................. 62/7; 62/50.1; 62/50.2; 123/525; 123/527
[58] Field of Search ................. 62/50.1, 50.2, 46.2, 62/7; 123/525, 527

[56] References Cited

U.S. PATENT DOCUMENTS

| | | | |
|---|---|---|---|
| 2,035,399 | 3/1936 | Murphy | 62/50.1 |
| 2,257,897 | 10/1941 | Zenner et al. | 62/50.1 |
| 2,384,677 | 9/1945 | Hill | 62/50.1 |
| 2,645,906 | 7/1953 | Ryan | 62/50.4 |
| 2,645,907 | 7/1953 | Droste et al. | 62/50.1 |
| 2,993,344 | 7/1961 | Reed | 62/50.1 |
| 3,183,678 | 5/1965 | Hosford | |
| 3,898,853 | 8/1975 | Iung | |
| 4,018,582 | 4/1977 | Hinds | |
| 4,080,800 | 3/1978 | Spaulding | |
| 4,406,129 | 9/1983 | Mills | 62/7 |
| 4,449,509 | 5/1984 | Young | 123/527 |
| 4,531,497 | 7/1985 | Smith | 123/525 |

FOREIGN PATENT DOCUMENTS 3233935 3/1984 Fed. Rep. of Germany .
0251598 11/1987 Japan .

*Primary Examiner*—Ronald C. Capossela
*Attorney, Agent, or Firm*—Rockey and Rifkin

[57] ABSTRACT

The delivery system of the invention consists of a pair of LNG fuel tanks mounted on a vehicle. A solenoid valve associated with each tank allows the vehicle operator to select the tank from which LNG is to be delivered to the engine. An automatic override system is provided whereby if the pressure in the non-selected tank rises above a predetermined level, the operator's tank selection is overridden and gas from the non-selected tank is used until the pressure falls below the predetermined level. This override system eliminates the need to vent gas to the atmosphere to avoid pressure build up and thereby eliminates waste of the LNG. Each tank is also provided with a pressure building capability such that the gas will always be delivered to the engine with sufficient pressure. The system is designed such that LNG from a stationary low pressure storage tank can be delivered at high pressure to refuel the tanks. Finally, a variable insulation barrier is provided in the fuel tanks to minimize heat transfer between the LNG and gas head.

8 Claims, 2 Drawing Sheets

LNG DELIVERY SYSTEM FOR GAS POWERED VEHICLES

BACKGROUND OF THE INVENTION

This invention relates generally to liquid natural gas (LNG) delivery systems and more specifically to a high pressure LNG delivery system particularly suited for use on a natural gas powered motor vehicle.

America's dependence on foreign sources of fuel oil has resulted in significant political and economic problems in recent years. As a result, great efforts have been made to find a cheap and reliable domestic energy alternative. One such alternative is LNG which is domestically available, plentiful and relatively inexpensive and environmentally safe as compared to oil. Because one of the largest uses for oil is as a fuel for motor vehicles, great strides have been made to develop natural gas powered engines.

One such engine is a dual-fuel modified diesel engine which runs on a 60/40 diesel fuel to LNG mixture. While this engine substantially reduces diesel fuel consumption, it requires that LNG be delivered to the engine at approximately 300 psi, a pressure approximately 6 times the normal storage pressure for LNG. This extremely high pressure causes storage and handling problems for the volatile LNG. These problems are magnified by the fact that the LNG must be carried on a motor vehicle where it is exposed to relatively high temperatures and constant motion.

Thus a safe, reliable and efficient high pressure LNG delivery system is desired.

SUMMARY OF THE INVENTION

The delivery system of the invention overcomes the above-noted problems and consists of a pair of LNG high pressure fuel tanks mounted on the vehicle. A solenoid valve associated with each tank allows the vehicle operator to select a primary tank from which LNG is to be delivered to the engine. An automatic override system is provided whereby if the pressure in the non-selected tank rises above a predetermined level, the operator's tank selection is overridden and gas from the nonselected tank is used until the pressure falls below the predetermined level. This override system eliminates the need to vent the gas to the atmosphere when excessive pressure build up occurs and thereby eliminates waste of the LNG. Each tank is also provided with a pressure building capability such that the gas will be delivered to the engine with sufficient pressure. The system is designed such that LNG from a stationary, low pressure storage tank can be delivered at high pressure to refuel the vehicle tanks. Finally, a variable insulation barrier is provided in the fuel tanks to minimize the heat transfer between the LNG and gas head to facilitate the creation of an "artificial" head pressure.

OBJECTS OF THE INVENTION

It is a general object of the invention to provide a high pressure LNG delivery system particularly adapted for use with a motor vehicle.

It is another object of the invention to provide a high pressure LNG delivery system that minimizes the waste and hazards associated with pressure build up in the vehicle storage tanks.

It is a further object of the invention to provide a high pressure LNG delivery system where high pressure gas is delivered from a stationary low pressure storage tank.

Other objects of the invention, in addition to those set forth above, will become apparent to one skilled in the art from the following detailed description of the invention.

DETAILED DESCRIPTION OF THE INVENTION

Figure 1:
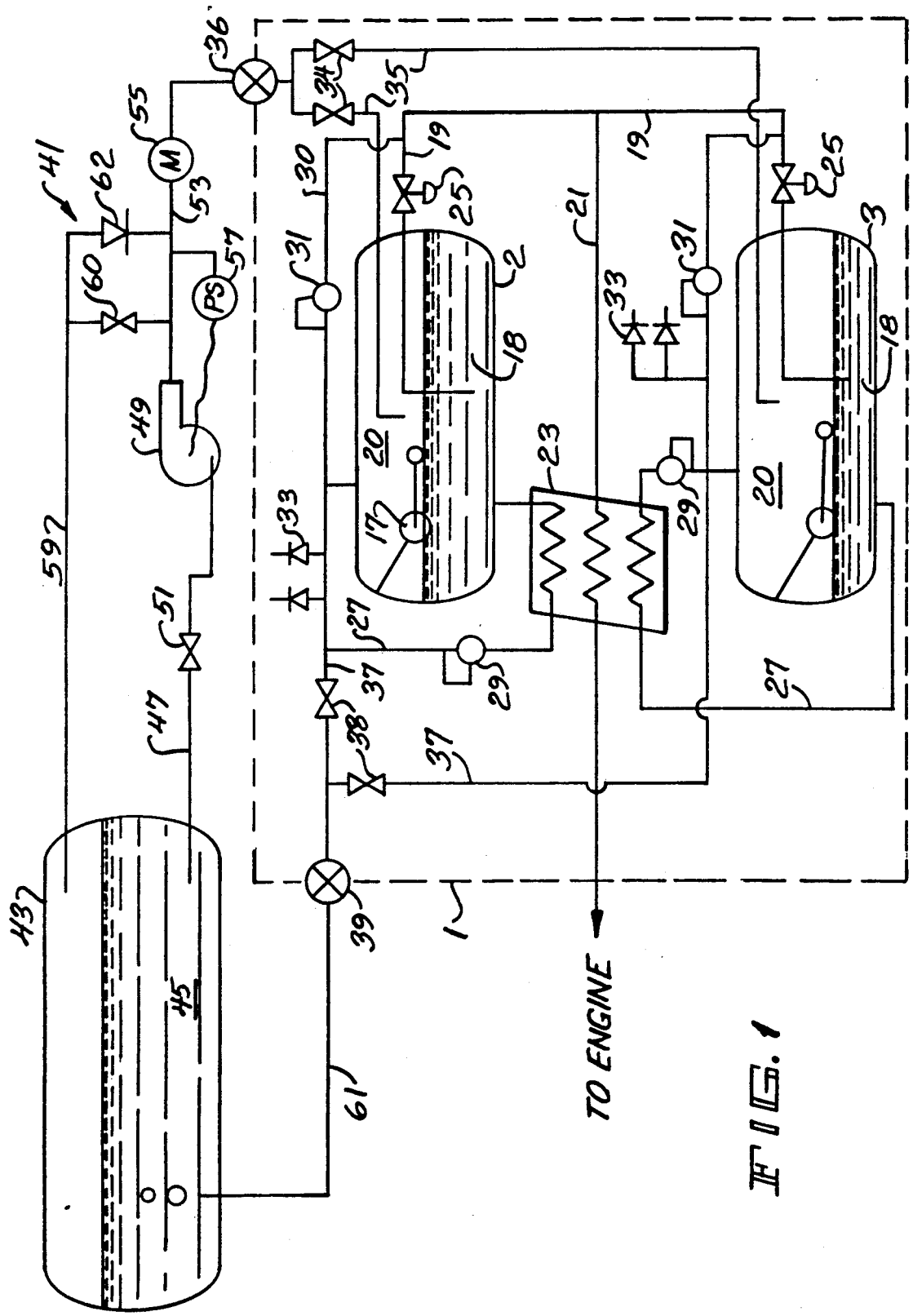
FIG. 1 is a schematic view showing the delivery system of the invention.
Figure 2:
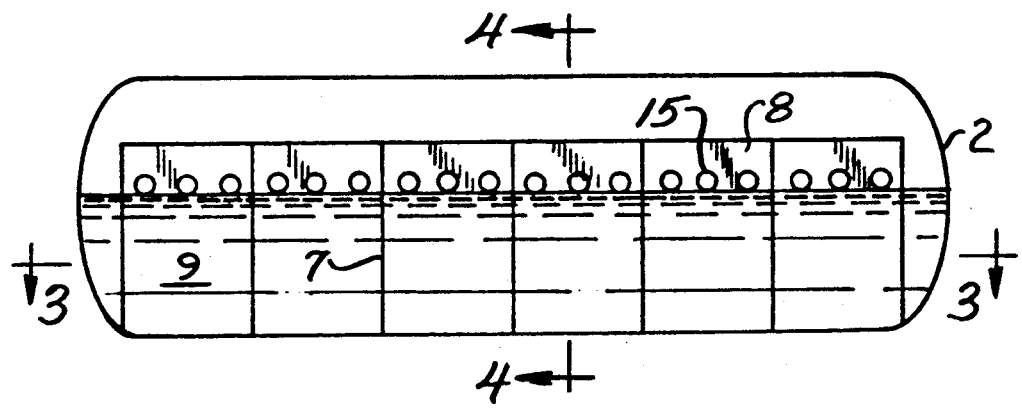
FIG. 2 is a sectional side view showing a vehicle mounted fuel tank according to the invention.
Figure 3:
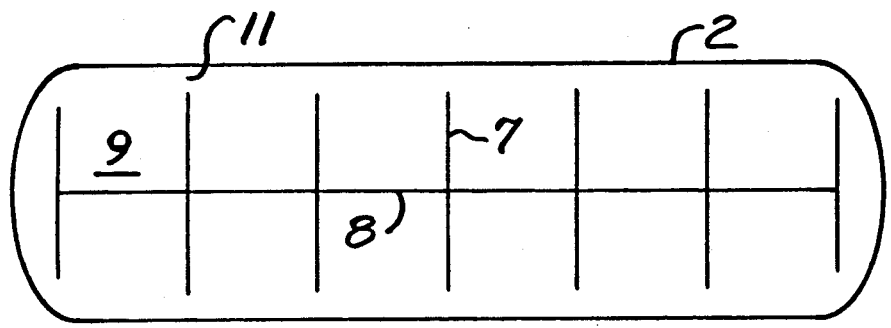
FIG. 3 is a section view taken along line 3—3 of FIG. 2.
Figure 4:
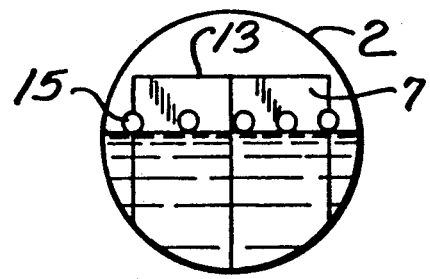
FIG. 4 is a section view taken along line 4—4 of FIG. 2.

Referring more particularly to FIG. 1, the delivery system of the invention is shown schematically at 1 consisting of a first fuel tank 2 and a second fuel tank 3 mounted on a vehicle (not shown). Fuel tanks 2 and 3 have identical construction such that the details of construction of the tanks will be made only with reference to tank 2, as best shown in FIGS. 2-4. Tank 2 consists of an insulated double-walled stainless steel tank 5 for storing the LNG at low temperatures. A plurality of baffles 7 are mounted on support 8 in tank 2 and preferably consist of planar stainless steel plates creating interconnected chambers 9. Chambers 9 can communicate with one another via spaces 11 such that the LNG can move between chambers. It will be understood that while the chambers are interconnected, the movement of the LNG in the tank is substantially damped by baffles 7.

Screens 13 and 14 are secured to the tops and bottoms, respectively, of baffles 7 to trap a plurality of glass or styrofoam beads 15 which float on the surface of the LNG. The baffles 7 and beads 15 minimize the sloshing of the LNG and create an insulation barrier between gas head 20 and LNG 18. The temperature of the gas in head 20 is, from a thermodynamic standpoint, significantly higher than the temperature of the LNG, such that if the LNG was allowed to freely mix with the natural gas, the heat transfer between the gas and LNG would condense the natural gas and collapse the pressure in the head. The ability of the insulation barrier to move with the LNG is critical because the fuel tank is intended to be mounted on a moving vehicle. Because the insulation barrier is composed of floating beads, it is able to move with the LNG as the LNG sloshes in the tank and minimize heat transfer between the LNG and the head.

The tanks are also provided with a sensor 17, such as a float, best shown in FIG. 1, to indicate the amount of LNG in the tank as will be understood by one skilled in the art.

Referring to FIG. 1, each of tanks 2 and 3 contains a liquid body 18 and a gas head 20 of natural gas vapor. The gas head forms as a result of vaporization within the tank and by operation of a pressure building circuit of the invention, as will hereinafter be described.

The delivery system for each of the tanks is identical such that like numerals will be used to identify like components associated with each of tanks 2 and 3. Each tank is provided with a gas use line 19 for removing the LNG from the tanks. The gas use lines 19 from each of the tanks meet at a universal main gas use line 21 that supplies the natural gas to the vehicle's engine.

Main gas use line 21 passes through a heat exchanger 23 such that the liquid delivered from tanks 2 and 3 will be converted to a gas before being delivered to the vehicle use device such as the engine. Heat exchanger 23 preferably consists of a non-insulated coil where the transfer of heat from the atmosphere and/or waste heat from the engine causes the liquid to vaporize and be delivered to the engine as a gas.

Located in gas use lines 19 are electronically operated solenoid valves 25. Solenoid valves 25 can be selectively opened and closed by the vehicle operator to select the tank from which the primary supply of liquid natural gas is to be delivered to the engine.

Tanks 2 and 3 are also provided with economizer lines 30 which connect the gas head in each of the tanks with their respective gas use line 19. Regulators 31 located in economizer lines 30 are designed such that if the pressure in either tank rises above a predetermined value, for example 350 psi, gas is delivered from that tank to its respective gas use line 19 regardless of which tank was selected by the vehicle operator to supply LNG to the engine.

In this manner, economizer line 30 and economizer regulator 31 override the tank selection made by the vehicle operator when a sufficiently high- pressure build-up develops in the non-selected tank. This override operation eliminates or greatly reduces the need to vent gas from the non-selected tank to the atmosphere during normal operation and thereby limits fuel waste.

If abnormally high pressure build up occurs, a safety vent valve 33 is provided to vent the tank to avoid damaging the equipment. The vent valve 33 is set to operate only if the pressure build up exceeds an abnormally high pressure, for example 500 psi, and, therefore, does not operate during normal operation of the system.

Tanks 2 and 3 also include pressure building lines 27. Pressure building lines 27 pass through heat exchanger 23 and connect the liquid body with the gas head of each tank. Pressure building lines 27 also include pressure building regulators 29. The pressure building lines 27 ensure that the pressure in the tanks is sufficient to feed liquid natural gas to the engine at a sufficient pressure, preferably 350 psi. The regulators 29 are designed such that if the pressure inside one of the tanks falls below a preset value, preferably 325 psi, the regulator will allow fluid to flow from the liquid body to the gas head through heat exchanger 23. Because the predetermined value set at regulator 29 is below the value set at regulator 31, the gas will flow back into the tank head rather than through the economizer line via regulator 31. The heat exchanger 23 converts the liquid to gas as it flows therethrough to thereby rebuild the pressure in the gas head and adequately pressurize the liquid to be delivered through use line 19.

Each tank is further provided with LNG fill lines 35 which connect the interior of the tanks with a quick disconnect coupling 36 located on the exterior of the vehicle. Depressurization lines 37 connect the gas head in each of the tanks to a second quick disconnect coupling 39 also located on the exterior of the vehicle. The gas fill lines 35 and depressurization lines 37 are used during a tank refill operation as will hereinafter be described.

To describe the operation of the system 1, assume that both tanks 2 and 3 are full. When it is desired to deliver LNG to the engine, the vehicle operator opens one of solenoid valves 25 to select either tank 2 or 3 as the primary fuel supply tank. As long as the pressure in the selected primary tank is sufficient, LNG will be delivered to the engine from that tank via gas use line 19 and heat exchanger 23.

However, if the pressure in the primary tank falls below the pressure set at pressure building regulator 29, pressure building regulator 29 will open such that liquid natural gas will be removed from the tank via line 27. The liquid gas will vaporize in heat exchanger 23 and will be delivered to the primary tank to rebuild the pressure in that tank.

The delivery system will continue to operate in this manner until and unless the pressure in the non-selected tank rises above the value set at economizer regulator 31. In that case, the economizer regulator 31 will open allowing gas to be delivered from the non-selected tank directly to its gas use line 19. The gas will be continued to be delivered from the nonselected tank until the pressure in that tank falls below the pressure set at regulator 31. Thus, the economizer line 30 acts to override the tank selection made by the vehicle operator in order to efficiently use existing gas pressure in the system.

The fixed location low pressure refilling system 41 will now be described with specific reference to FIG. 1. Supply system 41 consists of a single large capacity storage tank 43 holding a quantity of LNG 45 at relatively low pressure, preferably 50 psi.

A pump delivery line 47 connects the LNG in tank 43 to pump 49. A pump feed valve 51 is located in line 47 and controls the flow of LNG to the pump. Pump 49 increases the pressure of the LNG from 50 psi to approximately 350 psi. A system delivery line 53 connects the pump 49 to the quick disconnect coupling 36 such that the high pressure LNG is delivered through the fill lines 35 of the vehicle mounted delivery system to tanks 2 and 3.

A delivery meter 55, located in line 53, meters the amount of LNG delivered to the vehicle such that the delivery of LNG can be controlled. A pressure switch 57 is also connected to line 53 to sense the pressure of the LNG being delivered to tanks 2 and 3. If the pressure in line 53 should exceed a predetermined value, for example 475 psi, switch 57 will be tripped thereby shutting off pump 49 and preventing damage to the vehicle's delivery system.

A pump cool down recirculating loop 59 connects line 53 with the storage tank 43. Valve 60, in loop 59, is opened before the delivery to the vehicle begins to allow the cold LNG to circulate through the pump 49 and cool it down. A check valve 62 is also provided in loop 59 to allow the LNG and natural gas to return to storage tank 43 if the pressure should rise above a predetermined valve, for example, 500 psi.

Because the vehicle mounted tanks 2 and 3 store the LNG at pressures around 350 psi, the pumping of the LNG from tank 43 to tanks 2 and 3 would be slow and difficult absent a venting system. Thus, a vent line 61 is provided that connects tank 43 to vent lines 37 via quick disconnect coupling 39.

When delivery of LNG to the vehicle is desired, delivery line 53 is connected to quick disconnect coupling 36 and vent line 61 is connected to vent lines 37 via quick disconnect coupling 39. LNG is pumped into tanks 2 and 3 via lines 35 when valves 34 are in the open position. As pump 49 delivers LNG to tanks 2 and 3, valves 38 will be opened to allow high pressure gas in tanks 2 and 3 to vent to the low pressure storage tank 43 via vent lines 37 and 61. Thus, the head pressure in tanks 2 and 3 will decrease such that the delivery of LNG will be facilitated.

While the preferred embodiments of this invention has been shown and described in some detail, it will be understood by one of ordinary skill in the art that this description and the accompanying drawings are offered merely by way of example, and that the invention is to be limited in scope only by the appended claims.

What is claimed is:

1. A natural gas delivery system, comprising:
   a) a first vehicle mounted tank for storing liquid natural gas and natural gas vapor;
   b) a second vehicle mounted tank for storing liquid natural gas and natural gas vapor;
   c) a use line connected to said first and second tanks for receiving natural gas from the first and second tanks and delivering natural gas vapor to the use device on said vehicle and means for pressurizing the natural gas in the use line;
   d) means for selecting one of said first or second tanks to deliver natural gas to the use line; and
   e) means for overriding said selecting means to deliver natural gas vapor to the use line from either of said tanks in response to detecting a pressure rise therein which exceeds a preselected maximum.

2. The delivery system according to claim 1, further including means for filling said first and second tanks.

3. The delivery system according to claim 2, wherein said means for filling includes a storage means for holding liquid natural gas at a low pressure and means for delivering the liquid natural gas to the first and second tanks at a higher pressure.

4. The delivery system according to claim 3, wherein said means for filling further includes means for venting high pressure gas from said first and second tanks to said storage means.

5. The delivery system according to claim 1, wherein said means for selecting one of said first and second tanks includes a manually activated valve associated with each of said first and second tanks.

6. The delivery system according to claim 1, wherein said use line includes a heat exchanger for vaporizing the liquid natural gas.

7. The delivery system according to claim 1, further including a means for pressurizing the first and second tanks.

8. The delivery system according to claim 1, further including means for minimizing heat transfer between the liquid natural gas and the natural gas vapor in the first and second tanks.

* * * * *